United States Patent
Kennedy

(10) Patent No.: US 7,047,953 B2
(45) Date of Patent: May 23, 2006

(54) METHOD AND APPARATUS FOR DETERMINING A VALVE OPERATOR POSITION

(75) Inventor: Michael P. Kennedy, Wheaton, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 260 days.

(21) Appl. No.: 10/389,820

(22) Filed: Mar. 17, 2003

(65) Prior Publication Data

US 2004/0182372 A1 Sep. 23, 2004

(51) Int. Cl.
F02M 25/07 (2006.01)

(52) U.S. Cl. .......... 123/568.11; 701/103; 701/108; 123/568.21

(58) Field of Classification Search ......... 123/568.11, 123/568.21, 568.22, 568.23, 568.27; 701/103, 701/108

See application file for complete search history.

(56) References Cited

U.S. PATENT DOCUMENTS 6,508,237 B1 * 1/2003 Romzek et al. ........ 123/568.21
6,698,409 B1 * 3/2004 Kennedy et al. ....... 123/568.21

FOREIGN PATENT DOCUMENTS

JP 05-172008 * 7/1993

* cited by examiner

*Primary Examiner*—Carl S. Miller
*Assistant Examiner*—Arnold Castro
(74) *Attorney, Agent, or Firm*—Susan L. Lukasik; Dennis Kelly Sullivan; Jeffrey P. Calfa

(57) ABSTRACT

A valve operator position is determined for an exhaust gas recirculation valve (117) for an internal combustion engine (101). The valve position may be adjusted (313) for transient engine speed conditions and/or adjusted (309) for transient engine load conditions. During high transient states, the EGR valve is closed more, to allow more air to reach the cylinders of the engine, thereby improving engine performance.

20 Claims, 3 Drawing Sheets

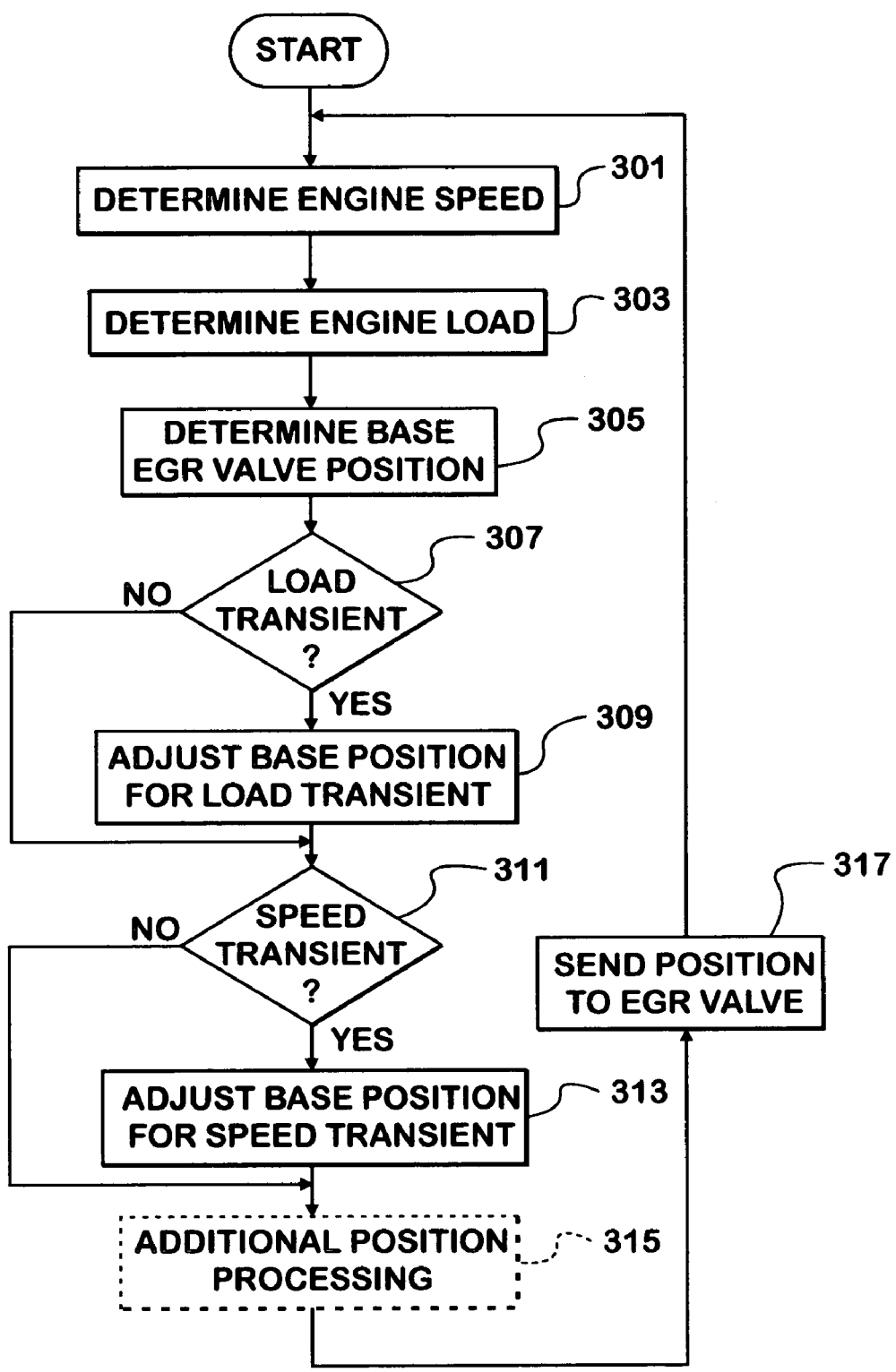

METHOD AND APPARATUS FOR DETERMINING A VALVE OPERATOR POSITION

This patent application claims the benefit of the priority of U.S. patent application Ser. No. 10/314,671, filed Dec. 9, 2002, and issued on Mar. 2, 2004 as U.S. Pat. No. 6,698,409.

FIELD OF THE INVENTION

This invention relates to internal combustion engines, including but not limited to control of the exhaust gas recirculation (EGR) systems in internal combustion engines.

BACKGROUND OF THE INVENTION

Internal combustion engines are known to include exhaust gas recirculation (EGR) systems to reduce NOx (nitrous oxide) emissions. Air enters the engine through a turbocharger via a compressor, which pressurizes the air. The pressurized air flows to an intake manifold and enters the cylinders of the engine. The compressor is coupled to a turbine, which is driven by exhaust gas from the cylinders. The exhaust gas from the cylinders enters an exhaust manifold and flows into the turbine. The exhaust gas exits the turbine and is vented to the atmosphere. A fraction of the exhaust gas is diverted from entering the turbine and routed back to the intake manifold. The resultant air charge to the cylinders contains both fresh air and combusted exhaust gas.

In order to achieve the desired exhaust gas flow through the EGR system and into the intake manifold, the pressure in the exhaust manifold must be higher than the (boost) pressure in the intake manifold. In addition, effective use of an EGR system provides a minimum air-to-fuel ratio for relatively clean, smokeless combustion to occur. In conditions where air-to-fuel ratio is favorable for EGR utilization, it is desirable to maximize EGR flow in order to lower NOx emissions. Unsuitable use of EGR systems may result in poor engine performance, including inadequate air-fuel ratio, air flow instability, fluctuating engine speed, engine stumbling, white and black smoke, and/or noise.

Accordingly, there is a need for an EGR system that provides effective air-to-fuel ratio to reduce poor engine performance.

SUMMARY OF THE INVENTION

A method of determining a valve operator position for an exhaust gas recirculation valve includes determining a base position for an exhaust gas recirculation valve for an internal combustion engine. The base position is adjusted based on at least one of current transient speed conditions and current transient load conditions of the internal combustion engine, yielding a valve operator position signal. The valve operator position signal is sent to the exhaust gas recirculation valve.

BRIEF DESCRIPTION OF THE DRAWINGS

FIG. 3 is a flowchart illustrating a method of determining EGR valve position in accordance with the invention.

DESCRIPTION OF A PREFERRED EMBODIMENT

The following describes an apparatus for and method of determining a valve operator position for an exhaust gas recirculation valve for an internal combustion engine. The valve position may be adjusted for transient engine speed conditions and/or transient engine load conditions. During high transient states, the EGR valve is closed more, to allow more air to reach the cylinders of the engine, thereby improving engine performance.

Figure 1:
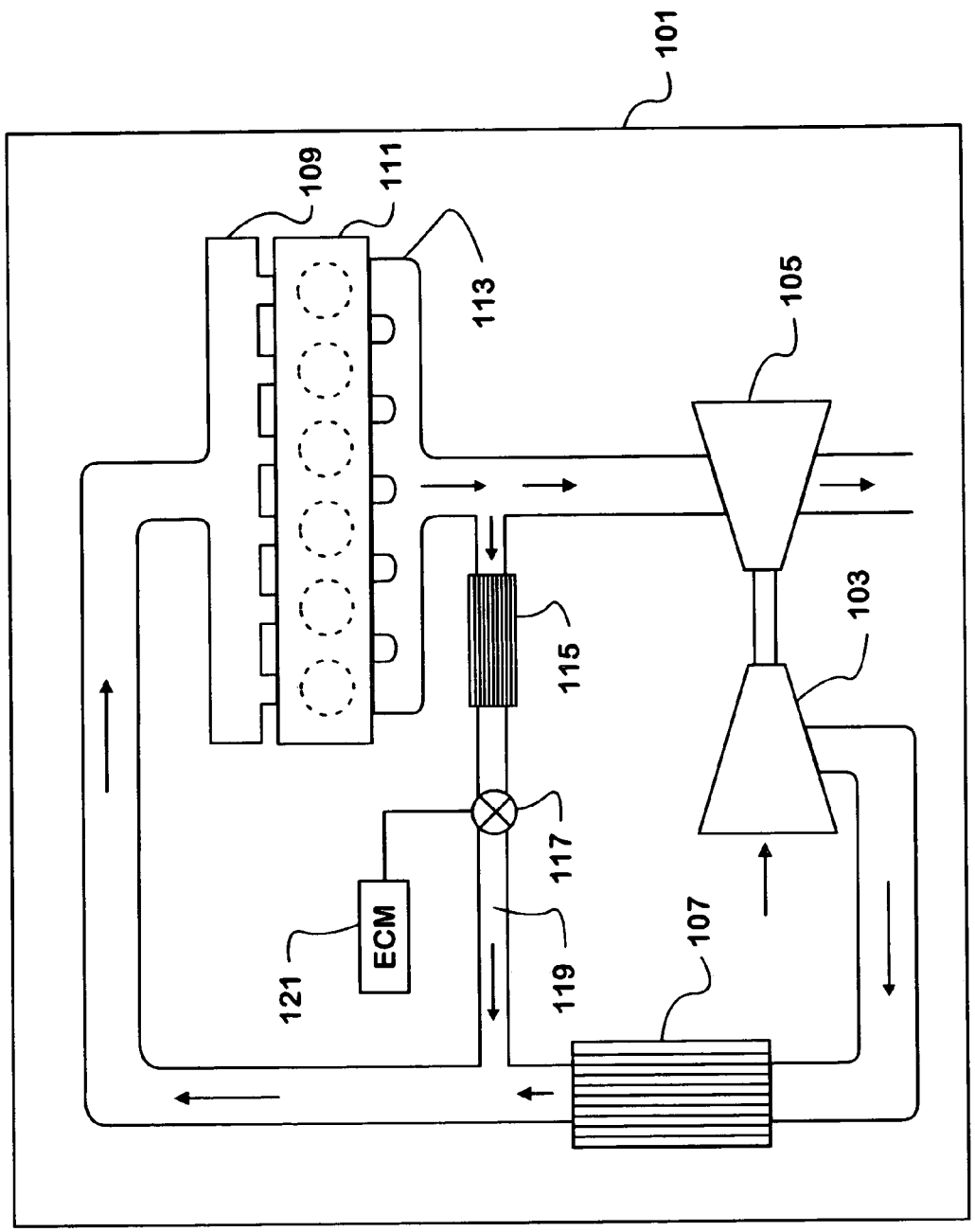
FIG. 1 is a block diagram of an internal combustion engine utilizing an EGR system in accordance with the invention.

A block diagram of an internal combustion engine 101 utilizing an EGR system is shown in FIG. 1. Air enters a compressor 103 of a turbocharger that includes a turbine 105. Compressed air exits the compressor 103 and is cooled by an intercooler 107. Cooled air output by the intercooler 107 enters the intake manifold 109, before entering the cylinders 111. Exhaust gas from the cylinders 111 enters an exhaust manifold 113, which feeds part of the exhaust gas into an EGR system and the rest of the exhaust gas into the turbine 105, where it exits the system.

Exhaust gas enters the EGR system and flows through an EGR cooler 115. Cooled exhaust gas passes through an EGR valve 117 having an operator, such as a disk (also known as a butterfly), ball, slide, one or more seats disposed on an axial member, and so forth, that determines how much flow passes through the EGR valve 117 by regulating the aperture of the valve. Depending on how open or closed the valve operator is, cooled exhaust gas passes through the valve into an EGR outlet 119. An Engine Control Module (ECM) 121 controls the position (how open or closed the operator is) for the EGR valve. Cooled exhaust gas and compressed air are combined in the intake manifold 109, and the resultant stream is provided to the cylinders 111.

Figure 2:
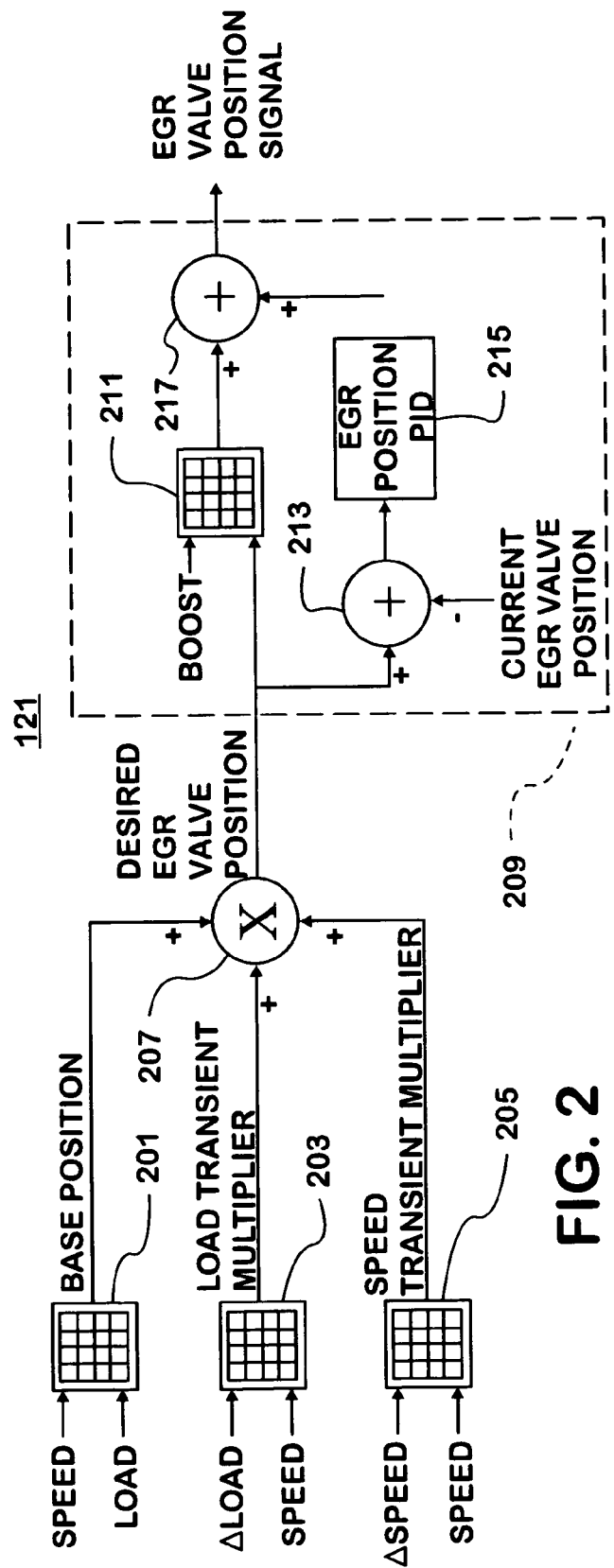
FIG. 2 is a block diagram of a part of an engine control module that determines EGR valve position in accordance with the invention.

A block diagram of a part of an ECM that determines EGR valve position is shown in FIG. 2. The EGR valve position is the same as the operator position for the EGR valve. The operator is the part of a valve that moves, either admitting all flow, admitting some flow, or preventing flow depending on the operator position.

The ECM 121 controls the position of the operator for the EGR valve by sending a valve operator position signal to the EGR valve 117. The EGR valve 117 receives the valve operator position signal from the ECM 121 and adjusts the operator to a position corresponding to the position in the valve operator position signal. For example, to completely close the EGR valve 117, a position signal with value 0 may be utilized, whereas a position signal with value 1 may be utilized to fully open the EGR valve 117. Intermediate positions between open and closed may also be utilized, e.g., 0.5 for a half-open EGR valve 117.

Although the ECM 121 determines the EGR valve 117 position in the embodiment described herein, other devices or processors may be utilized to provide this function. The ECM 121 may also provide other functions for the internal combustion engine 101 other than determining the EGR valve 117 position.

A base operator position determiner 201 receives as inputs an engine speed and an engine load and generates a base operator position for the EGR valve. The base operator position determiner 201 may be implemented, for example, by a look-up table stored in memory for access by the ECM 121. The base operator positions may be, for example, values between 0 and 1, where 0 represents a closed valve and 1 represents and open valve. Fractional values may represent how open (closed) the valve is. Table 1 illustrates example base operator position data for various engine speeds and loads. Engine speeds are measured in revolutions per minute (RPMs). Engine loads in Table 1 are fuel demand amounts or requests for fuel. Load or fuel demand is determined by the ECM 121 as a function of the amount of fuel required to maintain a desired engine speed/load via input of the accelerator pedal and may be measured in (mg/stk)/s. The EGR valve positions shown in Table 1 are interpreted as 0 is completely closed, 100 is fully open, and values in between 0 and 100 represent how open (as a percentage) the valve is, e.g., 10% open, 30% open, 50% open, and so forth.

TABLE 1

| N RPM | LOAD in (mg/stk)/s ||||| 
|---|---|---|---|---|---|
|  | Load1 | Load2 | Load3 | Load4 | Load5 |
| N1 | 10 | 0 | 0 | 0 | 0 |
| N2 | 30 | 30 | 50 | 100 | 100 |
| N3 | 30 | 50 | 100 | 100 | 100 |
| N4 | 30 | 100 | 100 | 100 | 100 |
| N5 | 30 | 100 | 100 | 100 | 100 |

A load transient determiner 203 receives as inputs engine speed and transient or differential engine load ($\Delta$Load) and generates a load transient multiplier. The load transient multiplier determiner 203 may be implemented, for example, by a look-up table stored in memory for access by the ECM 121. Table 2 illustrates example load transient multiplier data for various engine speeds and transient loads. Values for the load transient multiplier may be, for example between 0 and 1, where the load transient multiplier is closer to 0 when the current transient load conditions are large, and the load transient multiplier is closer to 1 when the current transient load conditions are small. Engine speeds in Table 2 are in RPM. Engine load changes or transients may occur at constant engine speed or at varying engine speed conditions. Load transients may be determined by comparing actual fuel demand amounts or requests for fuel at different times. The times may be separated by, for example, 0.5 seconds. Rapid increases in engine load/fueling in a given time period may exist. During these engine conditions, the air-to-fuel ratio is low, and EGR flow is undesirable. Thus, the data of Table 2 reflects various levels of load transients and how intensely the EGR valve 117 position is or is not affected.

TABLE 2

| N RPM | $\Delta$LOAD in (mg/stk)/s ||||||
|---|---|---|---|---|---|---|
|  | $-\Delta$Load3 | $-\Delta$Load2 | $-\Delta$Load1 | $+\Delta$Load1 | $+\Delta$Load2 | $+\Delta$Load3 |
| N1 | 0 | 0 | 1 | 1 | 0 | 0 |
| N1 | 0 | 0.2 | 1 | 1 | 0.2 | 0 |
| N3 | 0 | 0.5 | 1 | 1 | 0.5 | 0 |
| N4 | 0.1 | 0.6 | 1 | 1 | 0.6 | 0.1 |
| N5 | 0.3 | 0.75 | 1 | 1 | 0.75 | 0.3 |
| N6 | 0.75 | 1 | 1 | 1 | 1 | 0.75 |

A speed transient determiner 205 receives as inputs engine speed and transient or differential engine speed ($\Delta$N) and generates a speed transient multiplier. The speed transient multiplier determiner 203 may be implemented, for example, by a look-up table stored In memory for access by the ECM 121. Table 3 illustrates example speed transient multiplier data for various engine speeds and transient speeds. Values for the speed transient multiplier may be, for example between 0 and 1, where the speed transient multiplier is closer to 0 when the current transient speed conditions are high, and the speed transient multiplier is closer to 1 when the current transient speed conditions are low. Engine speeds and speed transients in Table 3 are given in RPMs. Speed transients may be determined by comparing engine speeds at different times. The times may be separated by, for example, 0.5 seconds. Rapid increases in engine speed in a given time period may exist. During these engine conditions, the air-to-fuel ratio is low, and EGR flow is undesirable. Thus, the data of Table 3 reflects various levels of speed transients and how intensely the EGR valve 117 position is or is not affected.

TABLE 3

| N RPM | $\Delta$N in RPM ||||||
|---|---|---|---|---|---|---|
|  | $-\Delta$N3 | $-\Delta$N2 | $-\Delta$N1 | $+\Delta$N1 | $+\Delta$N2 | $+\Delta$N3 |
| N1 | 0 | 0 | 1 | 1 | 0 | 0 |
| N2 | 0 | 0.2 | 1 | 1 | 0.2 | 0 |
| N3 | 0.15 | 0.6 | 1 | 1 | 0.6 | 0.15 |
| N4 | 0.2 | 0.7 | 1 | 1 | 0.7 | 0.2 |
| N5 | 0.6 | 0.85 | 1 | 1 | 0.85 | 0.6 |
| N6 | 0.8 | 1 | 1 | 1 | 1 | 0.8 |

Additional or fewer data points may be utilized in Tables 1, 2, and 3 depending on the desired degree of accuracy and/or the range of values for variables. Other values may be interpolated. Engine speeds, engine loads, speed transients, load transients, speed ranges, load ranges, and transient ranges will vary depending on the engine. The present invention provides for engine load transients and engine speed transients may be adapted for independently. Combinations of various levels of such transients are also taken into account.

A combiner 207 receives as inputs the base operator position, the load transient multiplier, and the speed transient multiplier and combines these values, yielding a desired operator position signal. In the example where the load transient multiplier has values between 0 and 1 and the speed transient multiplier has values between 0 and 1, the combiner 207 may be a multiplier that multiplies the base operator position, the load transient multiplier, and the speed transient multiplier to obtain the desired operator position signal.

The valve operator position signal may be the same as the desired operator position signal. Optionally, the desired operator position signal may be processed to yield the valve operator position signal that is sent to the EGR valve 117. Such processing may take place in a processor 209, such as shown in FIG. 2. Generally, the processor adjusts the desired operator position signal for air pressure in the intake manifold 109 and validates control of the EGR valve 117. An example processor includes a boost adjuster 211 that receives as inputs the desired operator position signal and the current boost data and generates a boost adjusted valve position that adapts for current boost data, i.e., the air pressure at the intake manifold 109. For example when high pressure levels apply an appreciable force on the EGR valve 117, the EGR valve 117 is opened more. A signal representing the current EGR valve position is subtracted from the desired operator position signal by adder 213, which outputs the result into an EGR position Proportional Integral Derivative (PID) 215, that performs the function of compensating for error in control of the EGR valve position, yielding a modified valve position that adjusts the desired operator position signal for any offset or error in valve control. The modified valve position is added to the boost adjusted valve position by an adder 217 that outputs the valve operator position signal that is provided to the EGR valve 117.

A flowchart illustrating a method of determining EGR valve position is shown in FIG. 3. The steps of the flowchart are performed by the ECM 121 in the embodiment shown in FIG. 1 and FIG. 2. At step 301, current engine speed for the internal combustion engine is determined. At step 303, current engine load for the internal combustion engine is determined. At step 305, a base position for the EGR valve 117 is determined. If at step 307, a load transient is present, the base position for the EGR valve 117 is adjusted, for example, by multiplying the base position for the EGR valve 117 by a load transient multiplier that is less than 1, thereby closing the EGR valve 117 to an extent driven by the load transient multiplier. The load transient multiplier causes the valve operator to close more when the current transient load conditions are large, and the load transient multiplier does not affect the valve operator position when the current transient load conditions are small or non-existent. Very large load transients result in a load transient multiplier of 0 that effectively closes the EGR valve 117. When large load transient conditions are present in the engine, sufficient air may not be present for the engine when the EGR valve 117 is open, and closing the EGR valve 117 allows for more air to reach the engine, thereby improving its performance during load transient conditions. If at step 307, a load transient is not present, no adjustment is made to the base position for the EGR valve 117, as would be the case when a load transient multiplier equal to 1 is utilized.

The process continues with step 311, where it is determined whether a speed transient is present in the engine. If at step 311, a speed transient is present, the position for the EGR valve 117 is adjusted, for example, by multiplying the position for the EGR valve 117 by a speed transient multiplier that is less than 1, thereby closing the EGR valve 117 to an extent driven by the speed transient multiplier. The speed transient multiplier causes the valve operator to close more when the current transient speed conditions are large, and the speed transient multiplier does not affect the valve operator when the current transient speed conditions are small or non-existent. Very large speed transients result in a speed transient multiplier of 0 that effectively closes the EGR valve 117. When large speed transient conditions are present in the engine, sufficient air may not be present for the engine when the EGR valve 117 is open, and closing the EGR valve 117 allows for more air to reach the engine, thereby improving its performance during speed transient conditions. If at step 311, a speed transient is not present, no adjustment is made to the position for the EGR valve 117, as would be the case when a speed transient multiplier equal to 1 is utilized.

At step 315, optional additional processing, such as the processing provided by the processor 209, may be performed on the position signal. At step 317, the valve operator position signal is sent to the EGR valve 117, and the process continues with step 301.

Although the present invention is illustrated by the example of a six-cylinder engine, the present invention may be applied to: engines having one or more cylinders, including those with less than or greater than six cylinders; various engine types, such as I-4, I-6, V-6, V-8, and so forth; engines having different cylinder firing orders; diesel engines, gasoline engines, or other types of engines; turbocharged and non-turbocharged engines; and engines of any size.

The present invention provides the advantage of independently adjusting the EGR valve position for engine speed transients and/or engine load transients. In high transient engine conditions, when poor air flow is likely to be present, the EGR valve is closed, to allow for better air flow to the engine. Similarly, when little or no transient engine conditions are present, good air flow is likely to be present, the EGR valve is allowed to behave in its usual way. Thus, when engine conditions exist such that the air-to-fuel ratio is low, EGR flow is lowered or eliminated. Better engine performance results, including better air-fuel ratio, reduced air flow instability, reduced engine stumbling, reduced white and black smoke, and/or reduced noise. Lower NOx, hydrocarbons, smoke, and/or particulate matter emissions result. Overall engine performance is improved during engine transient conditions. EGR valve position control is independent of the exhaust backpressure in the present invention, thus eliminating potential instability between the EGR valve position control and other air system controls that rely on exhaust backpressure, for example, a variable-geometry turbocharger or an electronically-controlled waste-gated turbo.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    determining a base position for an exhaust gas recirculation valve for an internal combustion engine;
    adjusting the base position based on at least one of current transient speed conditions and current transient load conditions of the internal combustion engine, yielding a valve operator position signal;
    adjusting the valve operator position signal for pressure at an air intake of the internal combustion engine;
    sending the valve operator position signal to the exhaust gas recirculation valve.

2. The method of claim 1, further comprising the step of adjusting the base position based on current transient speed conditions and current transient load conditions of the internal combustion engine, yielding the valve operator position signal.

3. The method of claim 1, wherein the base position is closed more when the current transient speed conditions are high, and wherein the base position is closed more when the current transient load conditions are large.

4. The method of claim 1, wherein the step of adjusting comprises determining at least one of (a) a load transient multiplier based on current engine speed and transient engine load and (b) a speed transient multiplier based on current engine speed and transient engine speed.

5. The method of claim 4, wherein the load transient multiplier has a value between 0 and 1, wherein the speed transient multiplier has a value between 0 and 1, and wherein the valve operator position signal has a range of values between 0 and 1, where 0 represents closed and 1 represents open for a valve operator position.

6. The method of claim 1, wherein the base position is based on a load and an engine speed for the internal combustion engine.

7. The method of claim 1, wherein the step of adjusting comprises:
   determining (a) a load transient multiplier based on current engine speed and transient engine load and (b) a speed transient multiplier based on current engine speed and transient engine speed; and
   adjusting the base position by combining the base position with the load transient multiplier and the speed transient multiplier.

8. A method comprising the steps of:
   determining a load and an engine speed for an internal combustion engine;
   determining at least one of a load transient multiplier based on current transient load conditions for the internal combustion engine and a speed transient multiplier based on current transient speed conditions for the internal combustion engine;
   determining a valve operator position for an exhaust gas recirculation valve for the internal combustion engine based on the load, the engine speed, and at least one of the load transient multiplier and the speed transient multiplier;
   adjusting the valve operator position for pressure at an air intake of the internal combustion engine.

9. The method of claim 8, wherein the speed transient multiplier causes the valve operator to close more when the current transient speed conditions are high, and wherein the load transient multiplier causes the valve operator to close more when the current transient load conditions are large.

10. The method of claim 8, wherein the load transient multiplier has a value between 0 and 1, wherein the speed transient multiplier has a value between 0 and 1, and wherein the valve operator position has a range of values between 0 and 1, where 0 represents closed and 1 represents open for the valve operator position.

11. The method of claim 8, wherein the step of adjusting comprises:
   determining a load transient multiplier based on current engine speed and transient engine load and a speed transient multiplier based on current engine speed and transient engine speed;
   adjusting the base position by combining the base position with the load transient multiplier and the speed transient multiplier.

12. An apparatus comprising:
   an exhaust gas recirculation valve having an operator, wherein the exhaust gas recirculation valve is arranged and constructed to receive a valve operator position signal and adjust the operator to a position conveyed in the valve operator position signal;
   a base operator position determiner, arranged and constructed to receive an engine speed value and an engine load value and to generate a base operator position;
   a load transient multiplier determiner, arranged and constructed to receive the engine speed value and an engine load transient value and to generate a load transient multiplier;
   a speed transient multiplier determiner, arranged and constructed to receive the engine speed value and an engine speed transient value and to generate a load transient multiplier;
   a combiner, operably coupled to the exhaust gas recirculation valve, base operator position determiner, the load transient multiplier determiner, and the speed transient multiplier determiner, wherein the combiner is arranged and constructed to combine the base operator position, the load transient multiplier, and the load transient multiplier, yielding a desired operator position signal;
   a boost adjuster, arranged and constructed to adjust the desired operator position signal based on air pressure at an intake manifold;
   wherein the valve operator position signal is based on the desired operator position signal.

13. The apparatus of claim 12, wherein the valve operator position signal is equal to the desired operator position signal.

14. The apparatus of claim 12, further comprising a processor, arranged and constructed to process the desired operator position signal into the valve operator position signal based at least on a current exhaust gas recirculation valve operator position.

15. The apparatus of claim 12, wherein the base operator position determiner generates a value between 0 and 1, wherein the load transient determiner generates a value between 0 and 1, and wherein the speed transient determiner generates a value between 0 and 1.

16. The apparatus of claim 12, wherein the load transient multiplier is closer to 0 when the engine load transient value is large, wherein the load transient multiplier is closer to 1 when the engine load transient value is small, wherein the speed transient multiplier is closer to 0 when the engine speed transient value is large, and wherein the speed transient multiplier is closer to 1 when the engine speed transient value is small.

17. The apparatus of claim 12, wherein a valve operator position signal equal to 0 corresponds to a closed operator for the exhaust gas recirculation valve, and wherein a valve operator position signal equal to 1 corresponds to an open operator for the exhaust gas recirculation valve.

18. The apparatus of claim 12, further comprising an exhaust gas recirculation position proportional integral derivative device, arranged and constructed to compensate for error in the desired operator position signal.

19. The apparatus of claim 12, wherein the combiner is a multiplier.

20. An internal combustion engine comprising the apparatus of claim 12.

* * * * *